Aug. 8, 1939. E. WENSLEY ET AL 2,169,063
APPARATUS FOR ASSEMBLING PARTS
Filed Sept. 11, 1935 3 Sheets-Sheet 3
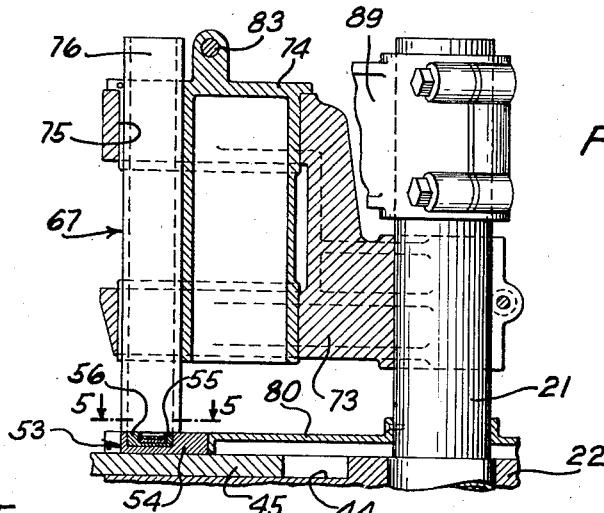
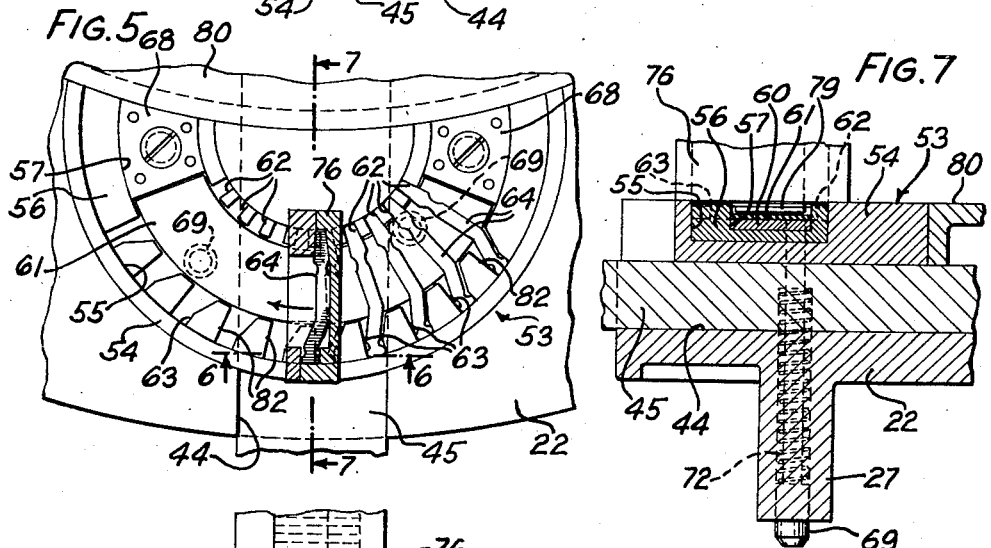
INVENTORS
E. WENSLEY
J. S. STULL
BY H. Q. Whitehorn
ATTORNEY Patented Aug. 8, 1939

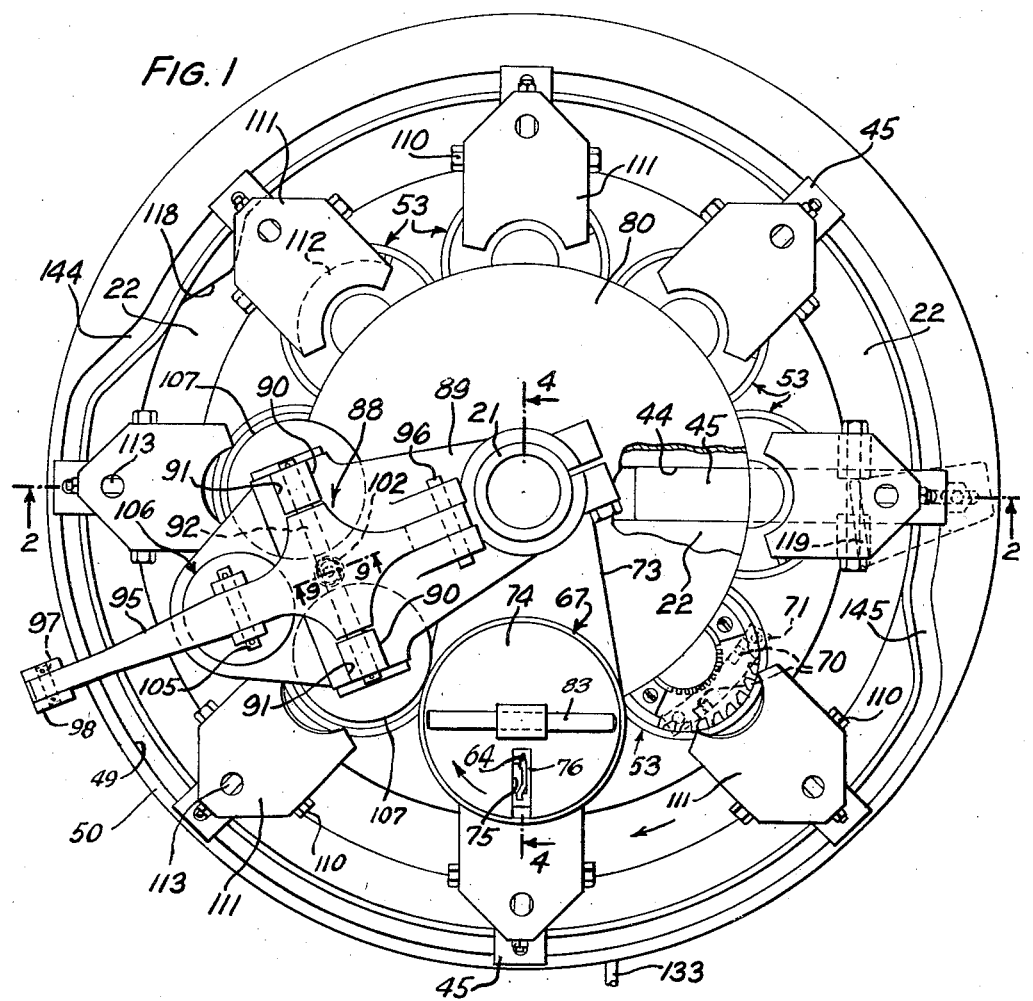

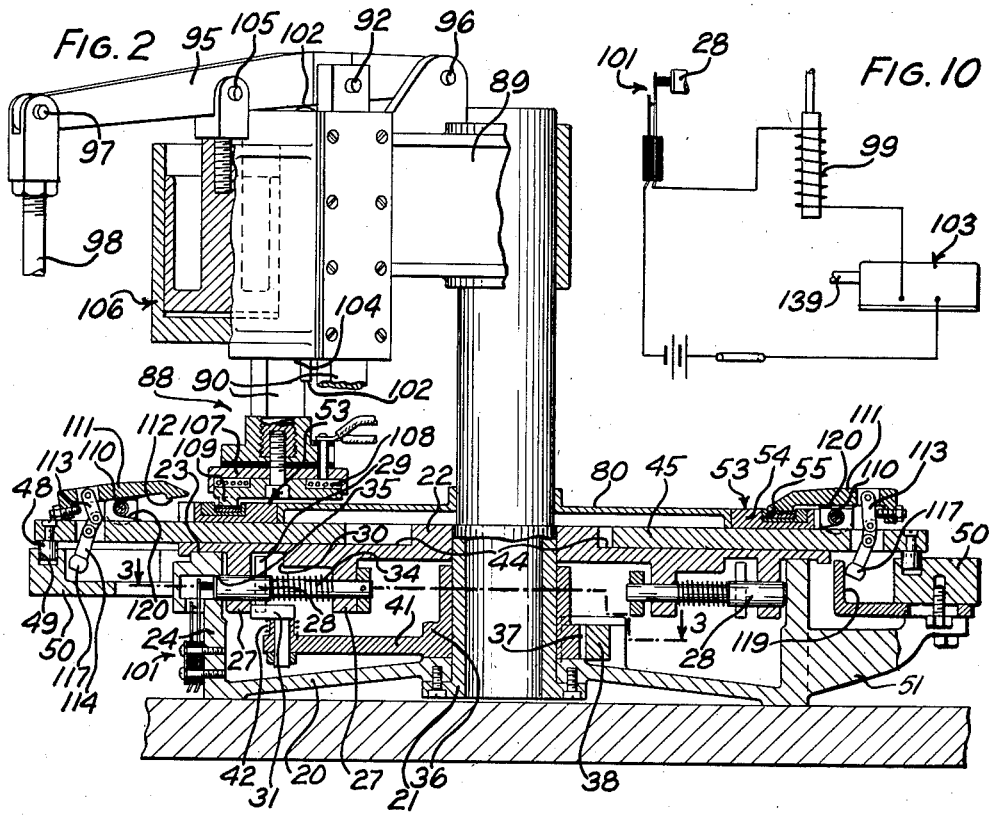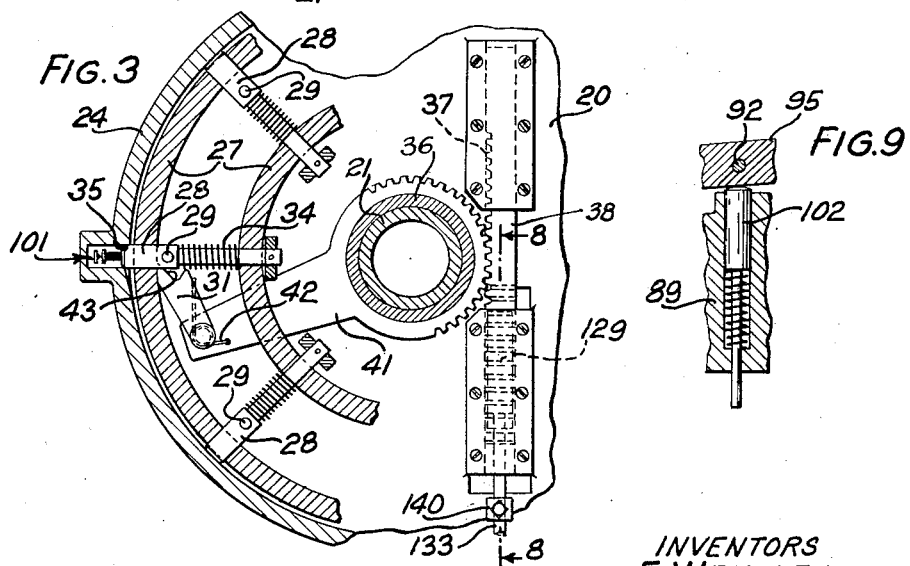

2,169,063

UNITED STATES PATENT OFFICE 2,169,063

APPARATUS FOR ASSEMBLING PARTS

Earl Wensley and John S. Stull, Chicago, Ill., assignors to Western Electric Company, Incorporated, New York, N. Y., a corporation of New York Application September 11, 1935, Serial No. 40,044

5 Claims. (Cl. 29—84)

This invention relates to apparatus for assembling parts, and more particularly to an apparatus for assembling and treating parts to make composite articles.

This invention is particularly applicable in assembling and bonding together in a desired arrangement and with an overall height the parts of a terminal unit of the type disclosed in U. S. Patent 2,087,330 to W. H. Pagenkopf and R. L. Hanson, July 20, 1937, and U. S. Patent 2,087,311 to E. Wensley, July 20, 1937. Such a unit in one embodiment comprises an insulating support of a desired thickness having upon one side thereof a dry coating of thermosetting resin to which a plurality of spaced conducting terminals are adhered. In order to effectively assemble these terminal unit parts great care must be exercised, first, to position the terminals in a desired spaced arrangement upon the coated side of the support and, second, while maintaining the parts thus positioned subjecting them to heat and pressure to bring them to a desired overall height during which the dry coating of thermosetting resin upon the support is first softened, thereby yielding under pressure, and while pressure is maintained the softened resin is cured, thus adhering the terminals to the support, the assembly then being cooled.

The primary object of this invention is to provide an apparatus for assembling and treating parts in an efficient and expeditious manner to produce uniform composite units.

To attain this and other objects in accordance with one embodiment of this invention as applied to the making of composite terminal units, an apparatus is provided which includes an intermittently rotatable work carrier having a plurality of spaced insulating support seats and associated conductor terminal guides, each seat being adapted to be moved in sequence from a loading station to an unloading station and operations performed intermediate these stations. At the loading station of each seat an insulating support having the side thereof with the dry coating of thermosetting resin facing upwardly is positioned thereon. At another station means is provided for causing a plurality of conducting terminals to be discharged from a magazine and positioned in a desired spaced arrangement by the guides upon the coated surface of the insulating support. At the following two stations of the last assembled support and terminals and the previous assembly multiple means is provided for applying heat and pressure to two assemblies at a time for a predetermined interval of time to soften the coating of thermosetting resin, adhere the parts together, and bring the assemblies to a desired overall height, the multiple heating and pressure means being automatically operated when the two assemblies are alined therewith. As each treated assembly leaves the heating and pressing means, clamps carried by the carrier at each seat are automatically actuated to maintain the assembly under pressure while cooling which continues until the unloading station is reached.

Other features and advantages of this invention will more fully appear from the following detailed description, taken in connection with the accompanying drawings, in which Fig. 1 is a plan view of an apparatus embodying the features of the invention, portions being broken away;

Fig. 2 is a vertical section taken on the line 2—2 of Fig. 1, a portion of the multiple means for applying heat and pressure to two assemblies at a time being shown partly in elevation and in section;

Fig. 3 is a horizontal section taken on the line 3—3 of Fig. 2;

Fig. 4 is a vertical section taken on the line 4—4 of Fig. 1, showing means for supplying and positioning terminals on the insulating support;

Fig. 5 is an enlarged horizontal section taken on the line 5—5 of Fig. 4, the figure being rotated 90° to agree with the position of the terminal supplying and positioning means as shown in Fig. 1;

Fig. 6 is an enlarged fragmentary vertical section taken on the line 6—6 of Fig. 5;

Fig. 7 is a vertical section taken on the line 7—7 of Fig. 5;

Fig. 8 is a fragmentary vertical section taken on the line 8—8 of Fig. 3 showing a portion of a foot treadle mechanism for actuating the work carrier, the lower foot engaging portion being omitted;

Fig. 9 is a fragmentary vertical section taken on the line 9—9 of Fig. 1, and

Fig. 10 is a diagrammatic view of a portion of the apparatus showing the electrical circuit associated therewith for causing the heat and pressure applying means to be applied to the assemblies in timed relation to the intermittent movement of the work carrier and for a predetermined interval of time.

General

Referring now to the drawings, particularly Figs. 1 and 2, a hollow circular shaped base of the apparatus is indicated at 20 which is fixedly supported upon a bench top or other suitable support. Secured axially to the base 20 and extending upwardly is a hollow stud shaft 21, surrounding which is an intermittently rotatable circular work carrier 22 having a continuous annular bearing, as indicated at 23 (Fig. 2), upon the upper surface of an upwardly extending flange 24 of the base 20. Integral with and depending from the under surface of the carrier 22 is a pair of spaced rings 27 forming bearings for eight equally spaced radially arranged spring pressed shouldered plungers 28 (Fig. 3) slidably carried in alined apertures in the rings. Carried vertically in each plunger 28 is a pin 29 which extends from each side of the plunger, the upper end of the pin being arranged to ride in a slot 30 formed in the carrier 22 which serves to hold the pin in its vertical position at all times. The lower end of the pin 29 extends into the path of a forked end of a lever 31. Surrounding each plunger 28 between the shoulder thereof and the inner bearing ring 27 is a compression spring 34 which acts to normally urge the plunger outwardly to either bear against the inner peripheral surface of the flange 24 of the base 20 or to move it into a locking aperture 35 provided in the flange at one point (Figs. 2 and 3), the latter position of the plunger serving to lock the carrier 22 from rotation after each intermittent movement thereof. The outward movement of the plunger 28 is limited by a collar fixed to the plunger at its inner end.

Rotatable upon the stud shaft 21 and having a bearing on the base 20 is a collar 36 having substantially one-half of its periphery formed with gear teeth which mesh with teeth 37 of a rack bar 38 reciprocably mounted in spaced bearings formed in the base 20. A foot treadle mechanism 39 (Fig. 8) to be described hereinafter is effective to operate the rack bar 38. Integral with the collar 36 is an arm 41 which at its free end pivotally carries the forked lever 31 previously mentioned. A torsion spring 42 surrounding the pivot of the lever 31 and operatively connected to the lever and the arm 41 normally acts to rotate the lever in a counterclockwise direction to cause it to ride at its free end against the inner periphery of the outer ring 27 during oscillatory movements imparted to the arm 41 in the operation of the apparatus. Referring particularly to Fig. 3 it will be noted that the forked end of the lever 31 is so shaped that in a clockwise movement of the collar 36 carrying the arm 41, the pin 29 will be engaged by an inner cam surface 43 formed on the longer furcation of the lever and thereby cause the plunger 28 to be withdrawn from the locking aperture 35. The withdrawal of the plunger 28 permits the carrier 22 to be indexed in the continued movement of the collar 36 to a succeeding position and as the carrier 22 nears the end of its indexing movement the following plunger 28 will ride into a slight recession formed in the inner periphery of the flange 24 in advance of the locking aperture 35 and then spring into the aperture. During the return movement of the arm 41 to the position shown in Fig. 3 the outer surface of the lever 31 will engage the pin 29 of the plunger 28 last advanced to locking position and cause the lever 31 to be rocked clockwise against the action of the spring 42 until it clears the pin, whereupon it will spring back into engagement with the inner periphery of the outer ring 27.

*Work supporting devices*

Formed in the upper surface of the carrier 22 (Figs. 1 and 2) are eight radially arranged slideways 44 in each of which is mounted a rectangular shaped plate 45 carrying upon its under surface at its outer end a roller pin 48 which is engaged in a cam groove 49 formed in the upper surface of a ring member 50 secured to a plurality of lugs 51 extending from the base 20, one of the lugs being shown in Fig. 2. Alined with and spanning each of the plates 45 are work supporting devices 53 (Figs. 1, 2 and 5), each comprising a crescent shaped base member 54 (Figs. 4 and 5) which is fixed to the carrier 22, the base member being formed with a concentrically arranged channel 55 in which is fitted a terminal support 56 also formed with a concentric channel 57 in which a work stripper pad 60 (Fig. 7) is fitted for vertical movement. At one position in the operation of the apparatus an insulating support 61 with its dry coating of thermosetting resin facing upwardly is positioned manually on the pad 60 which serves as a seat for the support during its assembly with the conducting terminals. The insulating supports 61 in one embodiment comprise arcuate shaped blanks formed from sheets of phenol fibre of a predetermined thickness, preferably heavily coated on one of their side surfaces with a thermosetting resin, such as phenol varnish, which is allowed to dry. For a more detailed description of the process of manufacturing the coated insulating supports 61 reference may be had to the hereinbefore referred to application of W. H. Pagenkopf and R. L. Hanson.

The spaced upper surfaces of the terminal support 56 at opposite sides of the channel 57 are each formed with a series of radially arranged slots 62 and guide seats 63, which in the present embodiment number ten, adapted to receive opposite offset ends of ten conducting terminals, indicated at 64, which are deposited therein in the operation of a rotary magazine and discharging device 67 to be referred to hereinafter. In opposite ends of the channel 57 of the terminal support 56 are fitted filler plates 68 which lie flush with the upper surfaces of the support 56 and above the upper surface of the pad 60, the plates forming end walls for the channel 57 for positioning the insulating support 61. Fixedly secured and depending from the stripper pad 60 are shouldered pins 69 (Figs. 5 and 7) which have a sliding fit in the member 54 and support 56 and project through shouldered apertures in the outer ring 27 of the carrier 22, the lower ends of the pins being arranged to engage cam surfaces 70 on a plate 71 fixed to the base 20, shown in dotted outline in Fig. 1, as they are carried therepast and move the pad 60 upwardly. Compression springs 72 surrounding the pins 69 within the apertures in the carrier 22 serve to return the pad to its lowered position as shown in the drawings after the pins ride down the cam surfaces.

*Terminal magazine and discharging device*

Rotatably carried in a bracket 73 clamped to the stud shaft 21 is the terminal magazine and discharging device 67 which comprises a cylinder 74 (Figs. 1 and 4) formed with a peripheral slot 75 extending vertically from top to bottom thereof. Slidably carried in the slot 75 is a hollow carrier 76 adapted to receive a stack of conducting terminals 64, the inner walls of the carrier being shaped to hold the irregularly shaped terminals in vertical alinement, as shown in Fig. 5. At its lower end the carrier 76 is formed with a horizontal lip 79 (Figs. 6 and 7)

upon which the lowermost terminal 64 rests, the lip being of such width and alined with the channel 57 on the support 56 that in the operation of the device 67 the lip travels freely along the channel. The carrier 76 slides upon spaced upper surfaces of the base member 54 during the movement of the lip 79 along the channel 57 and at other times by the lip sliding upon the filler plates 68 and a circular plate 80 surrounding and secured to the stud shaft 21, the plates 68 and 80 having their upper surfaces in a common plane. Since the lower surface of the lip 79 is disposed below the surface of the carrier 76 which slides upon the surfaces of the base member 54 the carrier will drop abruptly a slight distance as the lip slides off the right filler plate 68 (Fig. 5) as it enters the channel 57 and will rise up again as the lip moves onto the left filler plate 68.

This slight jogging action of the carrier 76 serves a useful purpose in that it tends to shake the conducting terminals 64 downwardly in the carrier and upon the lip 79. The advancing lower edge of the lip 79 is inclined or relieved to facilitate its movement upwardly when engaging the left filler plate 68. The surfaces of the support 56 between the slots and guides 62 and 63 are slightly inclined downwardly toward the left from points 82 (Fig. 6) so that as the cylinder 74 is rotated in a clockwise direction, as indicated by the arrows (Figs. 1 and 5), by means of a handle 83 the lowermost terminal 64 in the carrier 76 will ride down the first inclined portions of the slotted surfaces at the right end of the channel 57 and engage the side wall of the first set of slots and guides 62 and 63 at the points 82, thus withdrawing the terminal as the carrier 76 continues its rotation, whereupon it will drop into the slots and upon the insulating support 61. The magazine device 67 as shown in the drawings has been operated through about one-half of its rotative movement and has discharged and positioned four conducting terminals 64 onto the insulating support 61 and a fifth terminal is about to drop into the slots and guides 62 and 63.

In the continued rotation of the carrier 76 and in a manner similar to that described in connection with the first positioned terminal the successive nine lowermost terminals 64 in the carrier, each of which in the meantime has moved down to rest upon the lip 79 as the terminal thereabove is removed, will be withdrawn therefrom and deposited in the following slots and guides 62 and 63 and upon the insulating support 61. At the end of a complete rotation of the cylinder 74 ten terminals 64 will have been discharged from the carrier 76 and deposited in the spaced slots and guides 62 and 63 upon the insulating support 61 seated on the pad 60.

*Heat and pressure applying means*

Heat and pressure is applied simultaneously to two sets of the predeterminedly arranged conductor terminals 64 and insulating supports 61 at two stations or positions immediately in advance of the position where the magazine device 67 is arranged by means indicated at 88 (Figs. 1 and 2). This multiple heat and pressure applying means 88 is carried on a bracket 89 clamped to the stud shaft 21 and comprises a pair of vertical slides 90, of square cross-section, guided in slideways 91 provided on the bracket. At their upper ends the slides 90 are pivoted at 92 to a lever 95 which is pivoted at 96 to the bracket 89. To the opposite end of the lever 95 is pivoted at 97 a downwardly extending link 98, shown fragmentarily, which is operatively connected at its lower end to a core of an electrical solenoid 99, shown diagrammatically in Fig. 10. The solenoid 99 is energized through the closing of a spring switch 101, secured to the base member 20 (Fig. 2), whenever one of the plungers 29 springs into the locking aperture 35 at the end of each intermittent movement of the carrier 22. The resultant movement of the solenoid core which is attached to the lower end of the link 98 rocks the lever 95 counterclockwise about its pivot 96 and carries the slides 90 downwardly to their position shown in Fig. 2. This movement of the lever 95 stores energy behind a shouldered spring pressed plunger 102 (Figs. 1, 2 and 9) slidable in a shouldered aperture formed in the bracket 89, the lever 95 bearing at all times against the upper end of the plunger.

The solenoid 99 is deenergized after a predetermined interval of time by any usual or suitable mechanism, such as an escapement controlled spring actuated switch indicated in general at 103 (Fig. 10) which may be set to open the circuit to the solenoid 99 after the desired interval of time has passed. The switch 103 is wound up during each operation of the treadle mechanism 39 (Fig. 8) to advance the work carrier 22 to its next position. When the circuit to the solenoid 99 is broken by the operation of the switch 103 the spring pressed plunger 102 moves the lever 95 and the attached slides 90 to their upper position and holds them thereat until the solenoid is again energized. The operative connection between the treadle mechanism 39 and the switch 103 will be described hereinafter in describing the mechanism 39. The details of the switch 103 have been omitted from the disclosure since the switch forms no part of the invention and is not considered necessary to a complete understanding thereof. A lower surface 104 of the bracket 89 (Fig. 2) serves as a stop in the upward movement of the slides 90.

Intermediate the pivots 92 and 97 the lever 95 is pivoted at 105 to an air cylinder device 106 which in a well known manner serves to check the movement of the slides 90 when they are actuated either upwardly or downwardly. To the lower end of each of the slides 90 is attached a heating and pressing head 107 (Fig. 2) containing an electrical heating element 108. The lower surface of each of the heads 107 is formed with ten radially disposed projecting shoes 109 which have a spacing similar to the conductor terminals 64 and of such a length that they may be entered in the channel 57 of the support 56 as they are lowered by the slides 90 and engage under pressure the terminals, as shown in Fig. 2, which first effects a softening of the dry coating of thermosetting resin upon the surface of the insulating support 61 carrying the terminals 64, the resin yielding under pressure and bringing the assembly to a desired overall height during which the resin is cured and the parts adhered to each other. The terminals of the heating element 108 are connected to a suitable source of electrical energy (not shown) and preferably included in the circuit is an automatic heating element temperature control device of any usual type also not shown.

*Clamping mechanism for treated assemblies*

Pivotally mounted, as indicated at 110, upon each of the plates 45, which are slidable in the carrier 22, is a clamp member 111 (Figs. 1 and 2) having an arcuate shaped shoe portion 112 at its inner end for engaging the ten conducting terminals 64 after the assembly leaves the heating and pressing means 88. Operatively connected to the clamp member 111 and the plate 45 is a pair of connected toggle links 113 and 114, the latter link having a portion 117 which at predetermined points in the rotary movement of the carrier 22 moves into engagement with cam members 118 and 119 (Figs. 1 and 2), fixed to the ring member 50, which respectively causes the clamp member 111 to be rocked about its pivot 110 to engage and disengage the shoe portion 112 with the terminals 64 of the assembly. Surrounding the pivot 110 is a torsion spring 120, opposite ends of which bear against the under side of the clamp member 111 and the upper surface of the plate 45, the spring in cooperation with the toggle links 113 and 114 serving to retain the clamp member in one or the other of its positions as shown in Fig. 2, depending on which of the cam members 118 or 119, the portion 117 of the link 114 moves into engagement during the movement of the carrier 22.

Foot treadle mechanism

The foot treadle mechanism 39 for imparting reciprocatory motion to the rack bar 38 comprises, referring particularly to Fig. 8, a lever 125 pivoted at 126 upon brackets 127, fixed to the base member 20. At its lower end (not shown) the lever 125 is formed with a suitable foot engaging portion and at its upper end with a gear segment 128 which meshes with teeth 129 of the rack bar 38, the latter teeth being disposed at right angles to the teeth 37 of the rack bar which mesh with the teeth of the collar 36. Stop screws 132 threaded through lugs on one of the brackets 127 and arranged in the path of the lever 125 serve to limit the movement of the lever in either direction about its pivot. To index the work carrier 22 the operator rocks the lever 125 counterclockwise (Fig. 8) and this movement of the lever is limited by the left stop screw 132. Upon releasing his foot from the lever 125 the lever and the parts operatively connected thereto return to the position shown in Figs. 3 and 8, due to the weight of the lever, the lever engaging the right stop screw 132.

The operative connection between the treadle mechanism 39 and the spring actuated switch 103 (Fig. 10) comprises a link 133 pinned at one end to the rack bar 38 and having a sliding fit at its opposite end in a rack bar 134 reciprocable in a split two part bracket 135 carried by the switch mechanism 103. Journaled in the bracket 135 is a gear 136 fixed on a shaft 139 of the switch mechanism 103, the gear meshing with the rack bar 134. Carried on the link 133 is a collar 140 and surrounding the link between the collar and the right end of the rack bar 134 is a compression spring 141. As the link 133 moves to the left with the rack bar 38 during an indexing movement of the carrier 22 effected by the operator actuating the treadle mechanism 39 the link will freely slide through the rack bar 134 until the collar 140 engages and compresses the spring 141 to such a degree that motion is imparted to the rack bar. The movement of the rack bar 134 rotates the gear 136 which serves to wind up the spring of the switch mechanism 103 and close the circuit therethrough. During the return of the treadle mechanism 39 to its normal position the link 133 freely slides through the rack bar 134 and as the spring of the switch mechanism 103 unwinds the gear 136 receiving motion from the spring moves the rack bar 134 back to its normal position as shown in Fig. 8.

Operation

The operation of the several parts and devices employed in the assembling apparatus herein illustrated have been so fully explained in describing the parts in detail that a brief description of the operation of the apparatus as a whole it is believed will be sufficient.

Let it be assumed that the carrier 22 is in a quiescent position, as shown in Figs. 1 and 2, the multiple heating and pressing means 88 being in its lowered position and treating two assemblies carried upon the work supporting devices 53 alined with the heads 107 of the means 88 in the last actuation of the foot treadle mechanism 39. It is also assumed that the operator is actuating the rotary device 67 by means of the handle 83 in a counterclockwise direction to discharge therefrom ten conducting terminals 64 which will be positioned in a predetermined spaced arrangement by means of the slots and guides 62 and 63 of the device 53 upon the upper coated surface of the insulating support 61 which was positioned manually upon the pad 60 of the alined work supporting device 53 in the previous position of the device. While the operator is discharging the terminals 64 the escapement controlled spring actuated switch 103 (Fig. 10) is functioning, the switch having been set in operation during the last actuation of the treadle mechanism 39, and at the termination of a predetermined interval of time, for which the switch is set, the circuit to the solenoid 99 is broken and the heating and pressing means 88 is automatically moved upwardly. The means 88 is preferably in its upper position before the operator completes the operation of the device 67.

After completing the terminal feeding operation the operator actuates the treadle mechanism 39 to index the last assembled support 61 and terminals 64 under the heating and pressing means 88 and in line with the first head 107 thereof, the assembly last treated under this head being advanced to the second head. Thus it will be apparent that each assembly is subjected to heat and pressure twice by the means 88. At the termination of each indexing movement of the carrier 22 is locked by the plunger 28 entering aperture 35 and simultaneously therewith the circuit to the solenoid 99 is closed by the plunger closing the switch 101 and the heating and pressing means 88 is actuated to treat the assemblies alined therewith. It is to be understood that at the instant the switch 101 is closed the circuit through the timing switch mechanism 103 has been closed.

During the advance of each assembly from the second head 107 of the heating and pressing means 88 to the next position the slide plate 45 carrying the clamp member 111, one of which is associated with each work supporting device 53, is automatically moved inwardly due to the roller pin 48 moving along a portion 144 of the cam groove 49, thus alining the shoe portion 112 of the clamp member directly over the assembly. Immediately thereafter the toggle portion 117 moves into engagement with the cam member 118 and automatically causes the shoe portion of the clamp member to move downwardly and engage the terminals 64 of the assembly to maintain the assembly under pressure while cooling, which continues until the toggle portion moves into engagement with the cam member 119 which causes the shoe portion to be automatically moved upwardly free of the assembly. Immediately thereafter the roller pin 49 in moving along a portion 145 of the cam groove 49 causes the clamp member to be automatically moved outwardly to permit the assembly to be removed from the work supporting device 53 and reloaded.

As each work supporting device 53 carrying the completed assembly moves to the position immediately to the right of the magazine device 67, the spring pressed pins 69 of the stripper pad 60 ride up to the cam surfaces 70 of the plate 71 and raise the assembly in the channel 57 such a distance that the operator may readily remove it. By the time the unloaded work supporting device 53 comes to rest at its indexed position the pad 60 has been lowered to its normal position in the channel 57 and the operator then positions an insulating support 61 thereon and continues to operate the apparatus as above described. Each actuation of the treadle mechanism moves a completed assembly comprising an insulating support 61 with ten terminals 64 adhered thereto and having a desired overall height to the unloading position and simultaneously starts an assembly of predeterminedly arranged terminals and an insulating support through the apparatus where it is heated and pressed to the desired overall height in two successive operations and then is continuously clamped for the following four positions to maintain the assembly under pressure while cooling.

The advantages of the herein described apparatus are that it provides for a rapid production of uniformly constructed terminal units, functions in an efficient manner and does not require a highly skilled operator as is necessary in the operations of manually positioning terminals in a desired spaced arrangement upon their insulating support and while maintaining the parts thus positioned subject them to heat and pressure to cause their adherence and bring them to a desired overall height.

Although the invention has been disclosed and described as applied to an apparatus for producing terminal units, it is clear that it may have a more general application and that modifications can be made without departing from the scope of the appended claims.

What is claimed is:

1. In an apparatus for assembling conductor terminals upon an insulating support, the latter having a coating of thermosetting bonding material upon one face to which terminals are adhered, an intermittently rotatable work carrier having a plurality of work supporting seats for the insulating supports, a plurality of groups of spaced guides associated with each seat for positioning a plurality of terminals in predetermined single plane side by said spaced relation with each other upon a support, movable means carrying a supply of terminals at one position of said carrier cooperating with said terminal guides upon movement thereacross for discharging terminals successively between said guides and upon the support positioned on its seat in a preceding position of said carrier, a heating and pressing head operable upon the terminals in a following position of said carrier to apply heat and pressure to the terminals to soften the bonding material on the support, bring the assembly to a desired overall height and adhere the terminals to the support, actuating means for imparting intermittent rotary motion to said carrier to progressively advance the work supporting seats to successive positions to complete a cycle of operations, and means responsive to each operation of said actuating means for operating said heating and pressure head in timed relation to the intermittent motion of said carrier.

2. In an apparatus for assembling conductor terminals upon an insulating support, the latter having a coating of thermosetting bonding material upon one face to which terminals are adhered, an intermittently rotatable work carrier having a plurality of work supporting seats for the insulating supports, a plurality of groups of spaced guides associated with each seat for positioning a plurality of terminals in predetermined single plane side by side spaced relation with each other upon the support, movable means carrying a supply of terminals at one position of said carrier cooperating with said terminal guides upon movement thereacross for discharging terminals successively between said guides and upon the support positioned on its seat in a preceding position of said carrier, a heating and pressing head operable upon the terminals in a following position of said carrier to apply heat and pressure to the terminals to soften the bonding material on the support, bring the assembly to a desired overall height and adhere the terminals to the support, actuating means for imparting intermittent rotary motion to said carrier to progressively advance the work supporting seats to successive positions to complete a cycle of operations, clamping heads carried by said carrier engageable with the assemblies while cooling after they have moved from the heating and pressure head, and means including a cam track and cams actuated thereby for actuating said clamping heads.

3. In an apparatus for assembling a plurality of parts, a movable carrier having a plurality of work supporting seats for receiving a part in one position of said carrier, a plurality of groups of spaced guides each disposed on opposite sides of each of said seats for predeterminedly positioning a plurality of other parts relative to the first part in another position of said carrier, said guides having inclined upper faces, and movable means carrying a supply of the latter parts at said last position of said carrier cooperating with the inclined upper faces of said spaced guides upon movement thereacross for discharging successively between said guides a part.

4. In an apparatus for assembling a plurality of parts in side by side spaced relation upon another part, a rotatable carrier having a plurality of work supporting seats for receiving a part in one position of said carrier, a plurality of groups of spaced guides each disposed on opposite sides of each of said seats for predeterminedly positioning a plurality of other parts relative to the first part in another position of said carrier, said guides having inclined upper faces, and rotary means carrying a supply of the latter parts at said last position of said carrier cooperating with the work supporting device upon rotary movement across the inclined upper faces of said spaced guides thereof for discharging successively between said guides a part.

5. In an apparatus for assembling and treating parts to produce composite articles, one of the parts having a coating of thermosetting bonding material upon one face to which the other parts are adhered, a movable carrier having a seat for a coated part in one position of said carrier, a plurality of groups of spaced guides disposed on opposite sides of said seat for the ends of other parts to be positioned in a predetermined side by side spaced relation with each other upon the coated part in another position of said carrier, said guides having inclined upper faces, movable means at another position of said carrier for discharging between said spaced guides the latter parts, a heating head operable upon the assembled parts in another position of said carrier to apply heat to the parts to soften the bonding material on the coated part and adhere the other parts thereto, and means for actuating said heating head at the last position of said carrier for a predetermined period of time.

EARL WENSLEY.
JOHN S. STULL.